United States Patent [19]
Buschmann et al.

[11] Patent Number: 5,401,945
[45] Date of Patent: Mar. 28, 1995

[54] MOBILE DATA MEDIA AND A DATA EXCHANGE DEVICE

[75] Inventors: Horst Buschmann, Harsefeld; Karsten Niehusen, Reinbek; Burkhard Heuer, Himmelpforten; Thomas Niznik, Hamburg, all of Germany

[73] Assignee: National Rejectors Inc. GmbH, Buxtehude, Germany

[21] Appl. No.: 107,555

[22] Filed: Aug. 16, 1993

[30] Foreign Application Priority Data

Sep. 7, 1992 [DE] Germany .................. 42 29 863.6

[51] Int. Cl.⁶ .............................................. G06K 7/10
[52] U.S. Cl. ................................... 235/380; 235/379; 235/492
[58] Field of Search ...................... 235/379, 380, 492

[56] References Cited

U.S. PATENT DOCUMENTS 4,746,786  5/1988  Haberle et al. .................. 235/380
4,757,186  7/1988  Heberle et al. .................. 235/380
4,819,204  4/1989  Schrenk ...................... 235/380 X
5,003,520  3/1991  Grier et al. .................. 235/380 X

*Primary Examiner*—Donald Hajec
*Assistant Examiner*—Michael G. Lee
*Attorney, Agent, or Firm*—Vidas, Arrett & Steinkraus

[57] ABSTRACT

The invention relates to a mobile data recording medium, in particular a data card, comprising a memory field having a number of bits which can be read, cleared and reloaded by means of a data exchange device, wherein the memory field includes a first memory region having a number of memory locations, each having at least a bit, each bit representing a value unit and each memory location representing a predetermined time interval, and that the memory field includes a second memory region having a plurality of bits which second memory region represents a time period predetermined by its beginning and its length, wherein the length of the time period is a multiple of said predetermined time interval.

12 Claims, 2 Drawing Sheets

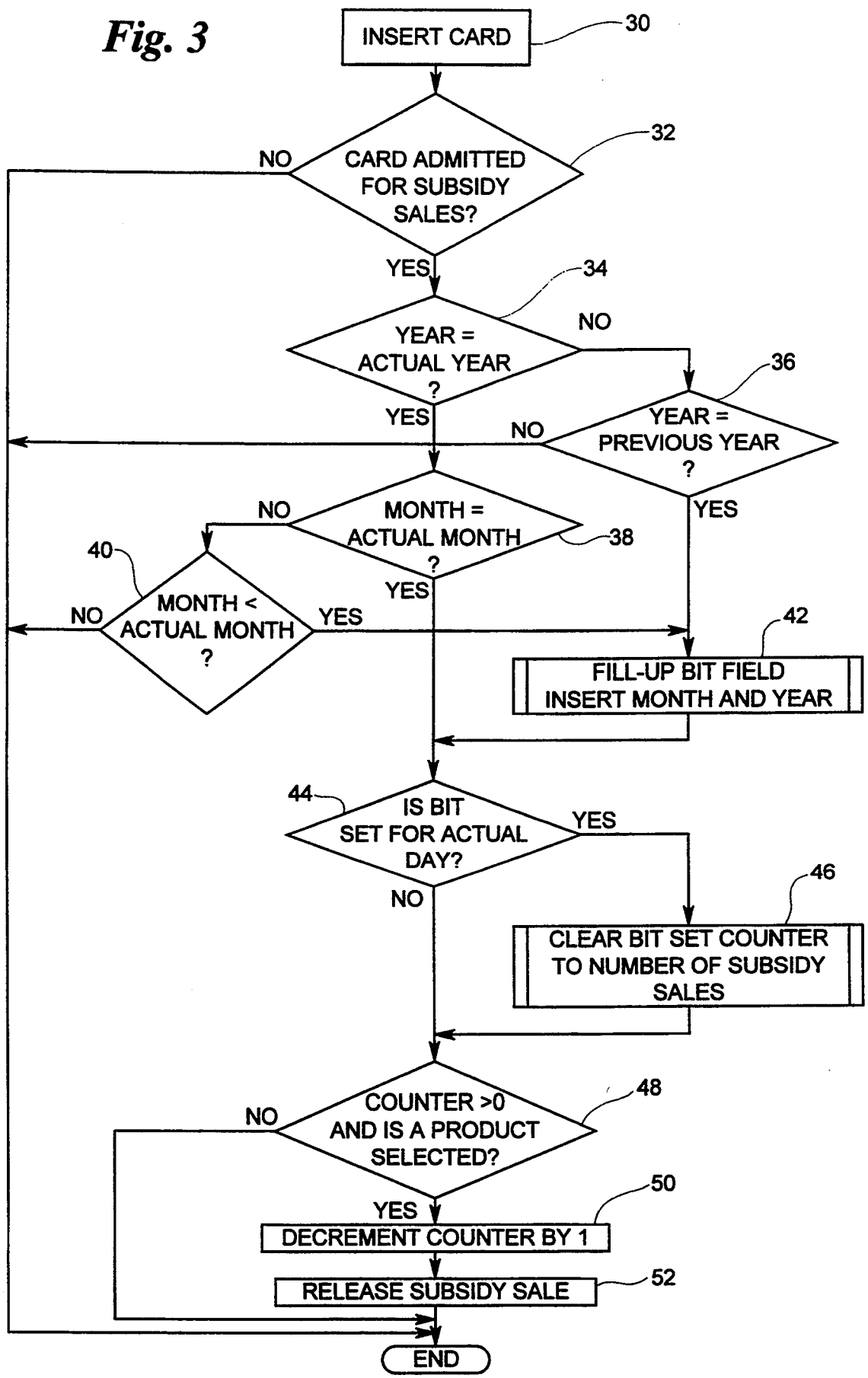

MOBILE DATA MEDIA AND A DATA EXCHANGE DEVICE

BACKGROUND OF THE INVENTION

The present invention relates to a mobile data medium and a data exchange device to be used therewith.

Data media for a cash-free money transfer are known in a broad variety. They are mostly applied as cards including a memory to be loaded with certain data. Basically, data media of this type include a code authorizing the card owner to draw or write off money from an account. This for example applies to credit cards or cheque cards. For other applications, the memory of the data medium includes a predetermined number of value units each one releasing a certain product or service when the data medium communicates with a data exchange device. When a value unit is present, a release signal will be generated so that the product or the service may be called in. At the same time one or more value units are cleared. If the memory is empty, the data medium is void and will be discarded like a telephone card. Alternatively, the data card may be reloaded by means of a data exchange device. For example, this may be performed by means of a recharging machine which is suited to reload the data medium after having paid a certain amount of money bit inserting coins or bills. As far as data media are concerned authorizing the owner to conducting so-called subsidy sales or free services, the reloading of the memory may take place without paying money or writing off the balance of the owner's account.

The memory space of data media is obviously limited. The larger the number of data being available at the same time, the higher is the memory capacity or, respectively, the faster the memory empties. The number of reloading processes is limited alike.

SUMMARY OF THE INVENTION

An object of the present invention is to provide a data medium, in particular a data card that needs a relatively small memory capacity for buying or subsidizing products, service goods or the like by using a vending machine. It is a further object of the invention to provide a data medium that does not require a communication of the data exchange devices with a central data unit when the data on the data medium are claimed for or processed.

BRIEF DESCRIPTION OF THE FIGURE

FIG. 3 is a flow chart showing a subsidy sale.

Referring to FIGS. 1 and 2, the data medium is shown generally at 10 and contains a memory field 12, the memory field 12 of the data medium 10 comprises a first memory region 14 having a plurality of memory locations each containing at least a bit, wherein each bit represents a value unit and each memory location represents a predetermined time interval. Furthermore, there is a second memory region 16 containing a plurality of bits. The second memory region represents a time period determined by its beginning and its length, wherein the length of the time period is a multiple of the predetermined time interval.

Figure 1:
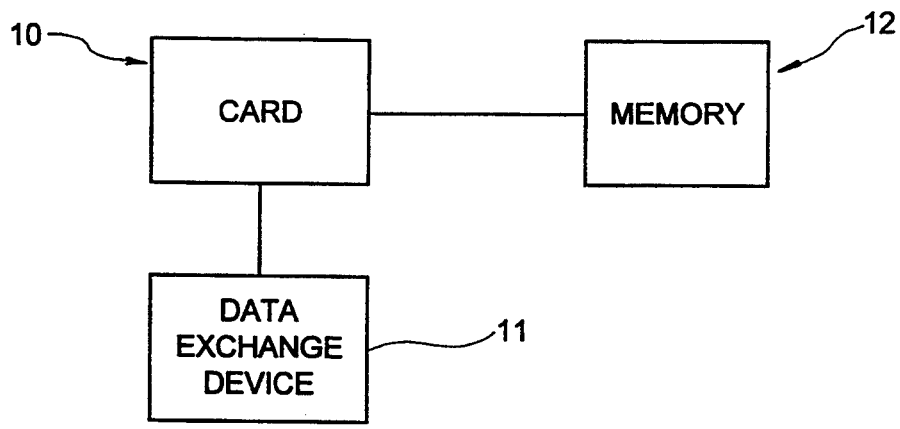
FIG. 1 is a block diagram of the invention.
Figure 2:
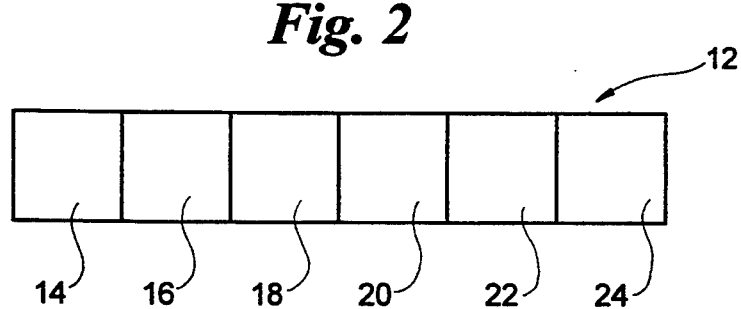
FIG. 2 is a block diagram of the memory of FIG. 1.

Each individual memory location may comprise one or a number of bits. The time interval may be made dependant before being applied, corresponding for example to the time interval of an hour or a day. Each bit corresponds to a certain value unit, for example for buying a product or a service or for subsidizing these items. In case, the memory location contains a number of bits, they can represent different value units. The content of the second memory region defines a time period which length is a multiple of the time interval. The time period may be a month, for example, and will be determined by its beginning and length. By using an additional memory region or, respectively, by the very memory region may be determined the year within which the time period is valid.

According to a further aspect of the invention, the position of a memory location within the first memory region may correspond to the position of the time interval in the time period, for example a certain day in a certain month.

In some applications it may be desired to repeatedly call up a value unit within a time interval. This may be realized by storing a multiple of this value unit by corresponding bits in the first memory region. This, however, might require a substantial memory capacity. According to the invention, a third memory region 18 is provided defining a counter having a limited number of bits which is associated to a predetermined bit position within all memory locations. Assuming that the counter i.e. the third memory region for bits, for example, 15 call-ups of a value unit per interval, for example per day, are possible. As a single counter only is required for all memory locations, the number of bits required for the total information may be reduced this way. By claiming one bit of a predetermined bit position and by clearing it at the same time the counter is set to a predetermined maximum value which can be predetermined in the data exchange device. Any further call-up of the same service results a decrementing step of the counter down towards zero, where no further service may be called-up anymore in the respective time interval.

According to an alternative embodiment of the invention, each memory location contains a plurality of bits, corresponding to a multiple of a value unit. In this case, the bits themselves may be used as a counter. This embodiment provides for the advantage that a repeated use of a value unit can be determined afterwards and may be recorded when desired. When a decrementing counter is used, there is no possibility of recording.

As mentioned before, it is possible to store the maximum number throughout the data exchange device to which maximum number the counter may be set up. Alternatively, a memory region within the memory field may store the maximum number.

According to a further aspect of the invention, the sequence of the bits or of the different value units of each memory location is predetermined and the same. It is possible thereby to prescribe the sequence according to which the products or services are called-up or consumed. For example, a value unit representing an alcoholic beverage cannot be called for unless a value unit for a meal has been called-up.

According to a further embodiment of the invention a fourth memory region 20 is provided storing a clearing or writing up code for the first and second memory region. Thus, a protection against access is provided for the data medium. On one hand, writing up the first and second memory region is possible only after successfully presenting a pass word. On the other hand, the clearing of the first and second memory region is possibly only after successfully presenting a different password, if desired. Finally, a fifth memory region 22 may be provided for storing an account from which the counter value for a service or a product may be booked off by means of the data exchange device when a value unit alone is not sufficient for payment of when no value unit anymore is available.

Finally, it is also possible to provide a sixth memory region 24 storing a barring note. This provides for the possibility to exclude the owner of this card from calling up certain products, for example subsidy sales. When a unitery number of subsidy sales for all owners of data media is desired, the predefined maximum number of available value units may be restricted by the data exchange device. This has the advantage that the exchange data devices only have to be reprogrammed when the number of available value units is changed, while the data media are maintained unchanged.

To call-up services or products the data medium according to the invention must be brought in communication with a data exchange device 11, for example a booking machine. A continuous or temporary communication between the individual booking machines or with a central station is not required. The data exchange device according to the invention requires at least a reading unit and a clearing unit. In using the reading unit which is time-responsive controlled, the respective time interval within the proper time period may be read, whereupon a further reading reveals whether or not one or more value units are available for calling-up a product or a service. As the calling up possibilities are limited, a clearing unit is required for erasing the respective value unit in the first memory region corresponding to the item called-up. In case that there is no conformity in comparing the second memory region, for example with the actual time period, a release signal for reading the first memory region or for releasing a service or a product cannot be generated. When the data medium is admitted to the actual time period, it is thus required to record the proper time period in the second memory region.

The data exchange device thus accepts data media only which are recognized to fit to the system and recognizes the actual date and time. It has to be further set to predetermine values for the value units, the time intervals and the time period.

Moreover, the data exchange device allows to change the memory content, for example the content of the second memory region and also of the first memory region. The data exchange device may further check based on the data read out whether or not there is an authorization for calling up a service or products. Accordingly, the time period stored in the data medium must include the actual time i.e. the time period may not have passed by. As already indicated, a signal may be produced for calling-up a service or product in response to the data exchange action performed and by the operator if desired, by actuating a selecting key, for example.

In detail, as indicated above, the data exchange device checks whether or not the actual time period of the data medium has been passed by. If this is not the case, it will be checked whether or not a value unit for calling-up a selected service or product is still available in the actually valid memory location. This can be easily realized for a data medium for which a value unit is defined by "1" while "0" defines its consumption. For data media operating with counters it has to be checked whether or not the account is equal to or greater than 1. For a value unit in the first memory region consumed the respective bit is changed, for example is set from 1 to 0 (clearing). For data media including counters, the counter is decremented. The data exchange device can further additionally write off the sale value for the service or product from an account loaded in the data medium when a value unit alone is not sufficient anymore for payment or when no value unit is available anymore.

The data exchange device is further enabled to updating the time period by changing the memory content in the second memory region. This requires the recognization that the time period has been passed by. A further check reveals whether or not updating the time period is allowed. To do this, further data stored in the data medium, such as the validity date or barring data can be used. A resetting of the first memory region (updating) as well as of the third memory region may be also performed by the exchange device. Special data exchange devices might be used for this purpose which are operated only by authorized persons. To accomplish this, all bits in the first memory region may be programmed to be set to 1 and possibly available counters to a certain maximum value. For data media in which the counters are represented by bits in the memory locations, the individual bits may be set to 1 and the bits combined to the counters are programmed to a predetermined maximum value. The predefined maximum values may be stored either on the data medium or in the booking machine. Finally, the updating also requires to record the actual time period in the second memory region on the data medium.

As indicated above, a counter may be alternatively used to detect the number of call-ups of the value units. The data exchange device is to be designed correspondingly. For updating the reprogrammable memory regions, a certain amount of money may be paid, for example which amount is withdrawn from the account programmed on the card. Alternatively, the amount may be paid in cash or by writing off from an account which is administered somewhere else. The entries to the data medium may be controlled by reading out using the data exchange device. It can be thus controlled whether or not calling-up a service or product was ligitimately made. The data read out may be provided with an explanation for display or printing.

In addition, the data exchange device can be used to print a receipt for having claimed a service or a product. It can be further connected to a data processing system.

FIG. 3 of the drawing shows a flow chart for subsidy sales using a data medium and a data exchange device according to the invention. After having recognized a data medium by using a data exchange device (block 30), for example a booking machine, which is admitted for subsidy sales (block 32), it will be checked whether or not first memory region must be reloaded as the time period has been passed by. For this the following checking is performed:

Is the entry of the year on the data medium valid? Valid are the actual year (block 34) and the previous year (block 36). When the year is not valid, no subsidy sales are possible.

Is the entry of the month on the data medium older than the actual month (blocks 38 and 40)? If yes, the first memory region must be reloaded and the actual month in the year must be loaded into the second memory region (block 42). When the programmed month is not yet reached, i.e. the actual month is older than the loaded one, subsidy sales are possible only then when the loaded month has been reached.

Is the bit for the actual date of the day still programmed (block 44)? If yes, the counter will be loaded with the predetermined maximum number and the bit is cleared (block 46). Here the value programmed on the card is checked first. When the value is greater zero, the counter will be loaded with this number. When the number programmed on the card is zero, the maximum number determined in the booking machine will be used.

After this checking process, the subsidy sale may be performed.

When the customer has selected product, the count on the data medium is checked whether its content is greater than zero (block 48). If yes, the counter is decremented at 1 (block 50) and a subsidy sale is conducted (block 52). A free sale may be conducted or a predetermined value may be placed to credit to allow for a sale herewith. It is possible to limit the value of the subsidy such that a more expensive product may be board only when a proper credit is available on the data medium. The amount exceeding the defined value will be taken from the account. When no value unit is available anymore (counter equals zero), the full amount is taken from the account.

The above disclosure is intended to be illustrative and not exhaustive. This description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A mobile data recording medium, comprising a memory field having a number of bits which can be read, cleared and reloaded by means of a data exchange device, characterized in that the memory field includes a first memory region having a number of memory locations, each having at least a bit, each bit representing a value unit and each memory location representing a predetermined time interval, and that the memory field includes a second memory region having a plurality of bits which second memory region represents a time period predetermined by its beginning and its length, wherein the length of the time period is a multiple of said predetermined time interval.

2. The data recording medium of claim 1, wherein the position of a memory location in the first memory region corresponds to the position of the time interval in said time period.

3. The data recording medium of claim 1, wherein a third memory region acting as a counter and having a limited number of bits is provided, which is associated to a predetermined bit position within all memory locations.

4. The device of claim 3, wherein a counter setting and decrementing means is provided for setting and decrementing the counter in the third memory region to a predetermined number after reading or, respectively, changing a value unit in the first memory region, when a value unit is consumed and the reading unit of the first memory region is active.

5. The data recording medium of claim 1, wherein each memory location includes a plurality of bits corresponding to a multiple of a value unit.

6. The data recording medium of claim 1, wherein the sequence of the bits or, respectively, the different value units for each memory location is predetermined and the same.

7. The data recording medium of claim 1, wherein an additional memory region (20) is provided to store a clearing code or an updating code for the first and second memory region.

8. The data recording medium of claim 1, wherein an additional memory region (22) is provided to store a credit on the data recording medium.

9. The device of claim 8, wherein a loading unit is provided for loading a number of value units into the first memory region and/or a new time period into the second memory region and/or a credit into the additional memory region (22).

10. The device of claim 8, wherein the reading unit reads and stores the number of value units of the first memory region which have been claimed.

11. A data exchange device for a data recording medium of claim 1, comprising a reading unit and a clearing unit, characterized in that the reading unit compares the time period loaded in the second memory region with the actual time period to generate in case of conformity a release signal for reading the memory location in the first memory region and that the clearing unit clears or, respectively, changes the respective bit of the first memory region read out.

12. The device of claim 11, wherein the reading unit determines whether or not a memory location of the time period corresponding to an actual time interval contains a respective value unit.

* * * * *